US012614477B1

(12) United States Patent
King et al.

(10) Patent No.: US 12,614,477 B1
(45) Date of Patent: Apr. 28, 2026

(54) RETAIL DISPLAY SIGNAGE APPARATUSES AND METHODS OF USING THE SAME

(71) Applicant: Retail First, Inc., Elgin, IL (US)

(72) Inventors: Brian King, Lakewood, IL (US); Frank Cannone, Bartlett, IL (US)

(73) Assignee: Retal First, Inc., Elgin, IL (US)

( * ) Notice: Subject to any disclaimer, the term of this patent is extended or adjusted under 35 U.S.C. 154(b) by 0 days.

(21) Appl. No.: 18/892,878

(22) Filed: Sep. 23, 2024

(51) Int. Cl.
*G09F 7/18* (2006.01)
*G09F 17/00* (2006.01)

(52) U.S. Cl.
CPC ........ *G09F 7/18* (2013.01); *G09F 2007/1821* (2013.01); *G09F 2007/1856* (2013.01); *G09F 2017/0041* (2013.01)

(58) Field of Classification Search
CPC ............... G09F 7/18; G09F 2007/1821; G09F 2007/1856; G09F 2017/0041; A47F 5/083; A47F 5/0823; A47F 5/0807; A47F 5/0838; A47F 5/0869; A47F 5/0006; A47F 5/0815; A47F 5/0861; A47H 1/04; A47H 1/06; A47H 1/08; A47H 1/02; A47H 1/022; A47H 2001/042; A47H 2001/0215; A47H 13/00; A47H 13/01; A47H 13/02; A47H 13/04; A47H 13/06
USPC ......... 211/7, 57.1, 59.1; 248/220.31, 220.41, 248/220.42, 220.22, 682, 685, 686; 16/87.2, 87.4 R
See application file for complete search history.

(56) References Cited

U.S. PATENT DOCUMENTS

| | | | | | |
|---|---|---|---|---|---|
| 2,991,968 | A * | 7/1961 | Lydard | A47F 5/0823 | 248/220.42 |
| 4,474,351 | A * | 10/1984 | Thalenfeld | A47F 5/0823 | 248/221.11 |
| 4,509,648 | A * | 4/1985 | Govang | A47F 5/0846 | 248/223.41 |
| 4,688,683 | A * | 8/1987 | Thalenfeld | A47F 5/0823 | 248/220.41 |
| 6,202,866 | B1 * | 3/2001 | Shea | A47F 5/0823 | 211/113 |
| 6,808,150 | B1 * | 10/2004 | Roetenberg | B25H 3/04 | 248/339 |
| 2007/0034581 | A1 * | 2/2007 | Weck | A47F 5/0823 | 211/59.1 |
| 2009/0056185 | A1 * | 3/2009 | Wamsley | G09F 7/00 | 40/611.12 |
| 2017/0116894 | A1 * | 4/2017 | Shea | G09F 7/22 | |

* cited by examiner

*Primary Examiner* — Cassandra Davis
(74) *Attorney, Agent, or Firm* — Scherrer Patent & Trademark Law, P.C.; Stephen T. Scherrer; Monique A. Morneault

(57) ABSTRACT

Retail display signage apparatuses provide an easy and useful placard to be displayed either parallel to or perpendicular to a face of a display for imparting useful information thereon. Methods of using the same are further provided.

16 Claims, 3 Drawing Sheets

RETAIL DISPLAY SIGNAGE APPARATUSES AND METHODS OF USING THE SAME

TECHNICAL FIELD

The present invention relates to retail display signage apparatuses. Specifically, the retail display signage apparatuses provide an easy and useful placard to be displayed either parallel to or perpendicular to a face of a display for imparting useful information thereon. Methods of using the same are further provided.

BACKGROUND

Eye-catching and useful retail displays are desired for selling retail products. Indeed, much research goes into determining how consumers retrieve information and are attracted to displays for purchasing products. Many retail displays are placed in certain locations within retail stores, such as on end-caps, at eye-level, or in other conspicuous locations to influence a consumer in purchasing the retail products displayed therein.

Typical retail displays, such as displays in brick and mortar retail stores, provide information to consumers immediately adjacent to the retail products. Oftentimes, the display information is displayed against the retail display itself, such as the shelves. Therefore, a consumer must typically walk through a retail store aisle to get closer to the products he or she may wish to purchase before obtaining information about the products. Specifically, display information is often presented in signs or placards directly on the shelves themselves, with the face of the sign or display parallel and immediately adjacent to a face of the retail display. A need, therefore, exists for improved retail display signage. Specifically, a need exists for retail display signage that is easy to find and read. More specifically, a need exists for retail display signage that imparts important information concerning retail products to consumers.

As consumers search for items within a brick-and-mortar retail store, they may miss important information concerning products within the retail displays. Oftentimes, retail stores have such a large number of items that consumers may become overwhelmed and specific products may become lost. A need, therefore, exists for improved retail signage that is easy to find and locate by consumers. Specifically, a need exists for improved retail signage that allows consumers to more adequately find products within a large store.

Oftentimes, information contained on retail displays changes rapidly. For example, endcaps on retail store aisles may have products thereon that change rapidly from one period to another. It is often difficult to change out display signage to match the change in products, especially in a store with a very large number of products. Workers must work quickly to address changes in retail displays and products contained therein to adequately present products to consumers for purchase. A need, therefore, exists for improved retail display signage apparatuses that are easy to change. Specifically, a need exists for improved retail display signage apparatuses that have quick-change elements for easily removing and adding new or additional information thereon.

SUMMARY OF THE INVENTION

The present invention relates to retail display signage apparatuses. Specifically, the retail display signage apparatuses provide an easy and useful placard to be displayed either parallel to or perpendicular to a face of a display for imparting useful information thereon. Methods of using the same are further provided.

To this end, in an embodiment of the present invention, a sign holder apparatus is provided. The sign holder apparatus comprises: a base having a connection hook configured to engage and be rigidly held to a retail display element, wherein the retail display element comprises a mating aperture for the connection hook; a first pole extending from the base and slidably disposed within a second pole; a sign placard comprising a first slot at a top thereof, the slot having a U-shaped carriage therein, wherein the U-shaped carriage is sized and shaped to slide within the second pole; and a second slot on a bottom of the second pole, wherein the sign placard is configured to slide through the second slot on the bottom of the second pole.

In an embodiment, the first pole has a square cross-section.

In an embodiment, the second pole has a square cross-section.

In an embodiment, the sign holder apparatus further comprises: a set screw within the second pole for holding the second pole in relation to the first pole.

In an embodiment, the base comprises at least two connection hooks.

In an embodiment, the sign placard extends vertically under the second pole and perpendicular to a front face of the base.

In an embodiment, the sign holder apparatus further comprises: an end cap frictionally held within an end of the second pole to hold the U-shaped carriage and sign placard in place within the second pole.

In an embodiment, the sign holder apparatus further comprises: a peg board adapter comprising a cuboid base, at least one slot within the cuboid base, and an extension hook configured to engage an aperture of a peg board, wherein the at least one slot within the cuboid base is configured to mate with the connection hook of the base of the sign holder apparatus.

In an alternate embodiment of the present invention, a sign holder apparatus is provided. The sign holder apparatus comprises: a base having a connection hook configured to engage and be rigidly held to a retail display element, wherein the retail display element comprises a mating aperture for the connection hook; a first pole extending from the base and slidably disposed within a second pole; a third pole extending perpendicular to the second pole; a sign placard comprising a first slot at a top thereof, the first slot having a U-shaped carriage therein, wherein the U-shaped carriage is sized and shaped to slide within the third pole; and a second slot on a bottom of the third pole, wherein the sign placard is configured to slide through the second slot on the bottom of the third pole.

In an embodiment, the first pole has a square cross-section.

In an embodiment, the second pole has a square cross-section.

In an embodiment, the sign holder apparatus further comprises: a set screw within the second pole for holding the second pole in relation to the first pole.

In an embodiment, the base comprises at least two connection hooks.

In an embodiment, the sign placard extends vertically under the third pole and parallel to a front face of the base.

In an embodiment, the sign holder apparatus further comprises: an end cap frictionally held within an end of the third pole to hold the U-shaped carriage and sign placard in place within the second pole.

In an embodiment, the sign holder apparatus further comprises: a peg board adapter comprising a cuboid base, at least one slot within the cuboid base, and an extension hook configured to engage an aperture of a peg board, wherein the at least one slot within the cuboid base is configured to mate with the connection hook of the base of the sign holder apparatus.

In an alternate embodiment of the present invention, a peg board adapter apparatus is provided. The peg board adapted apparatus comprises: a cuboid base; at least one slot within the cuboid base; and an extension hook extending from the cuboid base and configured to engage an aperture of a peg board, wherein the at least one slot within the cuboid base is configured to anchor a connection hook of a base of a sign holder apparatus.

In an embodiment, the cuboid base comprises a pair of slots configured to anchor a pair of connection hooks of the base of the sign holder apparatus.

In an embodiment, the peg board adapter apparatus further comprises: a plurality of extension hooks extending from the cuboid base configured to engage a plurality of apertures within the peg board.

In an embodiment, the peg board adapter apparatus further comprises: a peg board, wherein the peg board adapter apparatus engages within the peg board via the extension hook extending from the cuboid base, and further wherein the cuboid base engages a pair of connection hooks of a sign holder apparatus.

It is, therefore, an advantage and objective of the present invention to provide improved retail display signage.

Specifically, it is an advantage and objective of the present invention to provide retail display signage that is easy to find and read.

More specifically, it is an advantage and objective of the present invention to provide retail display signage that imparts important information concerning retail products to consumers.

In addition, it is an advantage and objective of the present invention to provide improved retail signage that is easy to find and locate by consumers.

Specifically, it is an advantage and objective of the present invention to provide improved retail signage that allows consumers to more adequately find products within a large store.

Moreover, it is an advantage and objective of the present invention to provide improved retail display signage apparatuses that are easy to change.

Specifically, it is an advantage and objective of the present invention to provide improved retail display signage apparatuses that have quick-change elements for easily removing and adding new or additional information thereon.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to retail display signage apparatuses. Specifically, the retail display signage apparatuses provide an easy and useful placard to be displayed either parallel to or perpendicular to a face of a display for imparting useful information thereon. Methods of using the same are further provided.

Now referring to the figures, FIGS. 1-4 illustrate a retail display sign holder apparatus 10 in an embodiment of the present invention. As illustrated, the sign holder apparatus 10 may extend from a retail display wall 12 and provide easily accessible and viewable information, such as to consumers or shoppers within a store. The sign holder apparatus 10, as further shown in FIGS. 2 and 3, comprises an extendable pole 14 having a sign placard 16 disposed on an end thereof.

Figure 5:
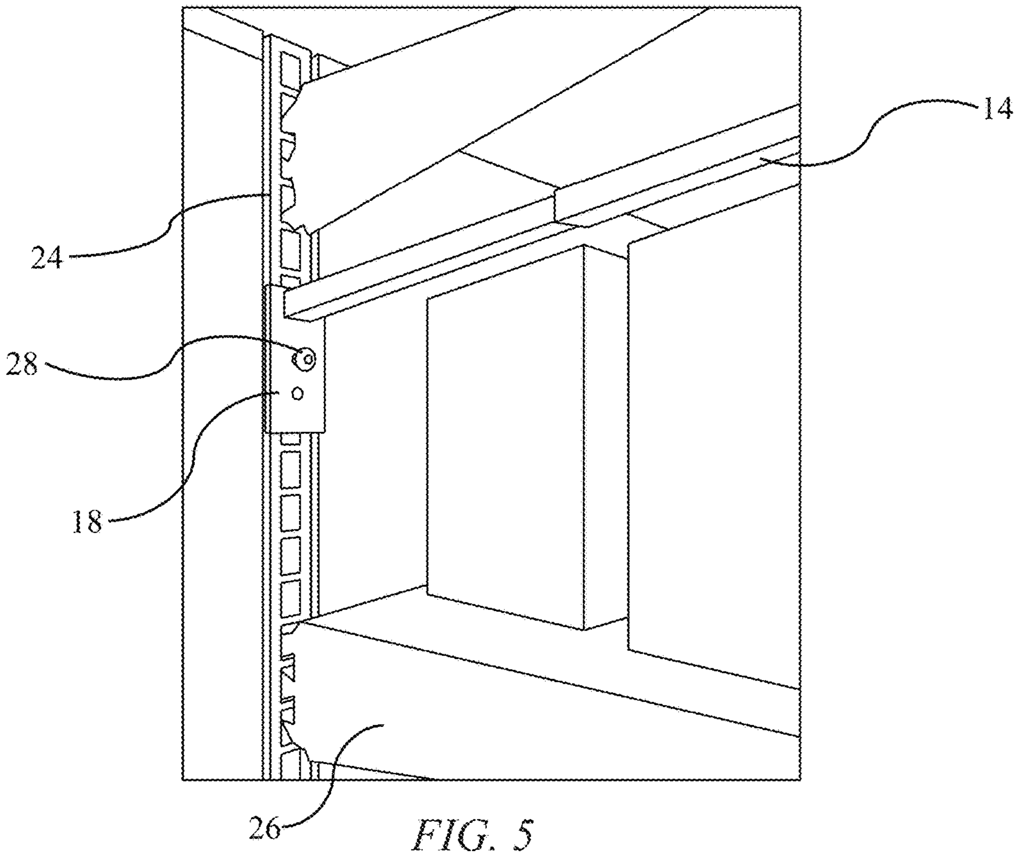
FIG. 5 illustrates a close-up perspective view of a sign holder in an embodiment of the present invention.

The sign holder apparatus has a base 18 from which the extendable pole 14 extends therefrom. The base 18 comprises a plate 20 having hooks 22 extending from a back side thereof opposite the front side from which the extendable pole 14 extends. The hooks 22 may be stacked in a vertical configuration to be configured to engage a slotted display post 26, as illustrated in FIG. 5, which may typically be used to anchor shelves 26 and other similar elements. A set screw or bolt 28 may extend through an aperture 30 within the base 18 to rigidly hold the base 18 in place on the slotted display post 26.

Figure 2:
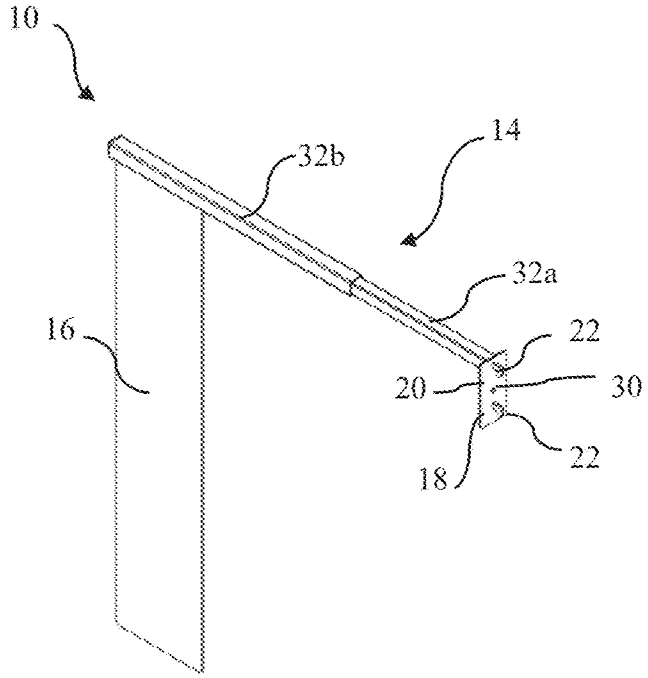
FIG. 2 illustrates a reverse perspective view of a sign holder in an embodiment of the present invention.
Figure 3:
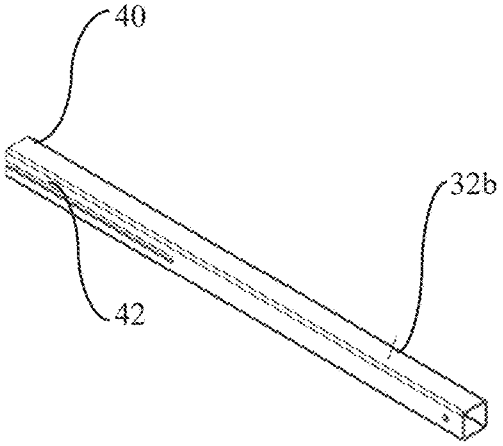
FIG. 3 illustrates a bottom perspective view of a pole segment having a slot therein in an embodiment of the present invention.
Figure 4:
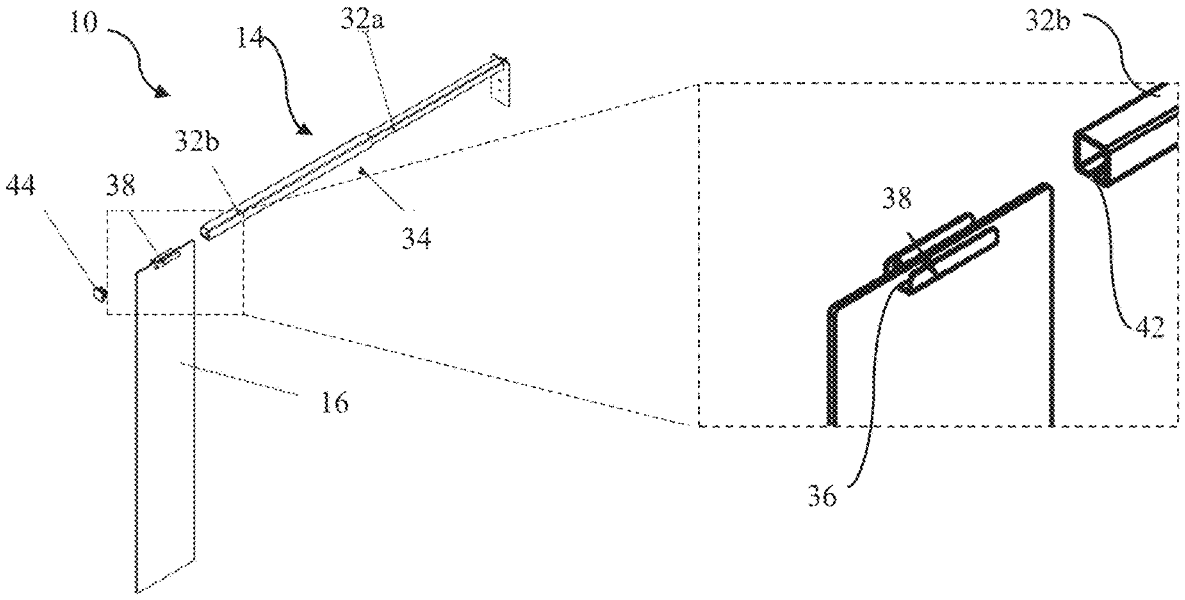
FIG. 4 illustrates an exploded view of a sign holder and a close-up view thereof in an embodiment of the present invention.

As illustrated in FIGS. 2 and 4, the extendable pole 14 may have a first pole segment **32*a* which may be nested within a second pole segment 32*b* allowing the second pole segment 32*b* to slide along the first pole segment 32*a* to extend and/or retract the extendable pole 14. A set screw 34 may be utilized to hold the second pole segment 32*b* in position relative to the first pole segment 32*a* when a desired length is selected by a user thereof. As illustrated herein, the first and second pole segments 32*a*, 32*b* may have a square cross-section; however, it should be noted that the first and second pole segments 32*a*, 32*b*** may have any other cross-sectional shape and should not be limited as described herein.

Figure 1:
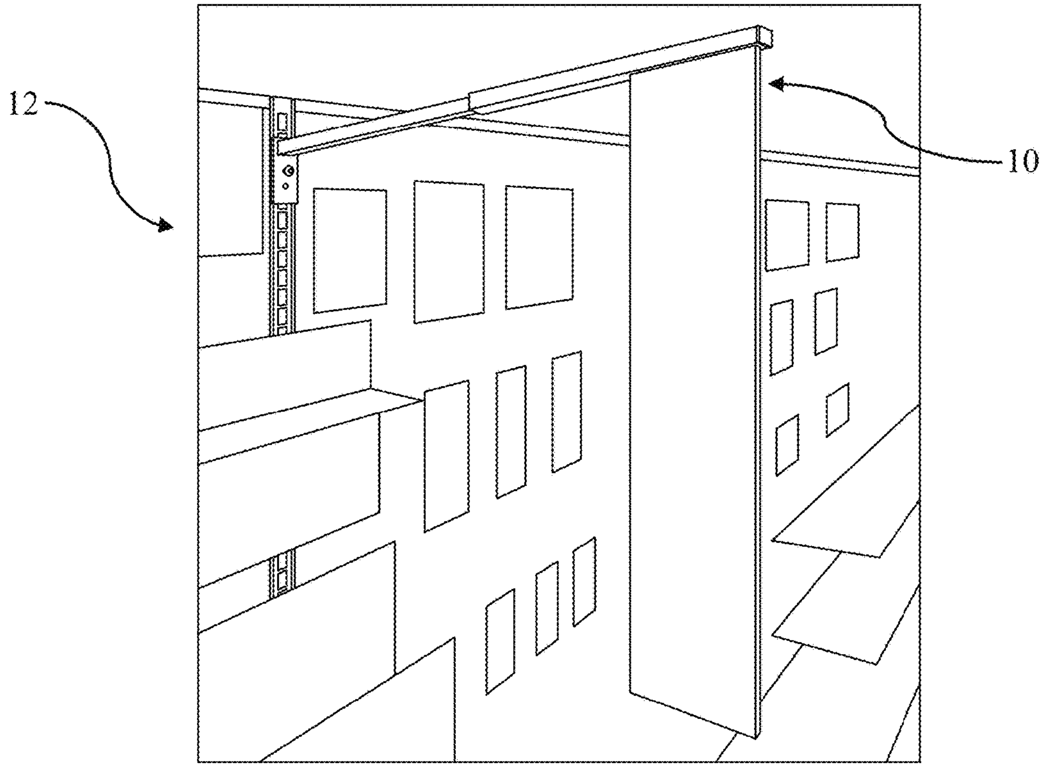
FIG. 1 illustrates a perspective view of a sign holder in an embodiment of the present invention.

The sign placard 16 may extend from the extendable pole 14, as illustrated in FIGS. 1, 2 and 4. As shown in FIG. 4, specifically, the sign placard 16 may have a slot 36 within which a U-shaped carriage 38 may be disposed. The U-shaped carriage 36, as illustrated in FIG. 4, may be sized and shaped to slide within an end 40 of the second pole segment 32*b* through a slot 42 in a bottom of the second pole segment 32*b*, which is shown in more detail in FIG. 3. Once the U-shaped carriage 36 and the placard 16 are slid within the end 40 and through the slot 42 of the second pole segment 32*b*, a cap 44 may be placed over the end 40 of the second pole segment 32*b*, thereby holding the U-shaped carriage 36 and, therefore, the sign placard 16, within the second pole segment 32*b*. The sign placard 16 may, therefore, be held in place within the second pole segment 32*b* and may hang, disposed roughly perpendicular to the base 18, allowing the indicia on the sign placard 16 to be viewable. The sign placard 16 may have any indicia thereon, including images, text, or other like features that may be useful for communicating to consumers or shoppers at a retail store location.

Figure 6:
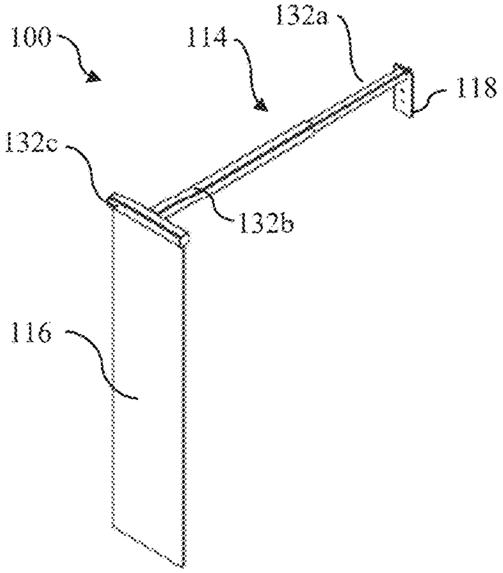
FIG. 6 illustrates a perspective view of a sign holder in an alternate embodiment of the present invention.
Figure 7:
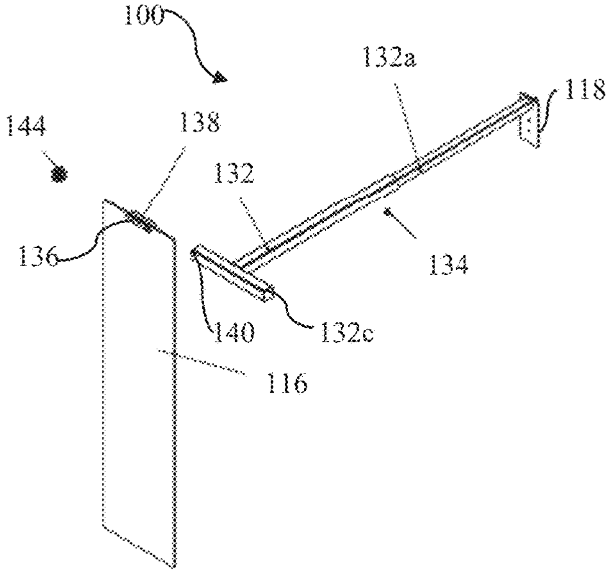
FIG. 7 illustrates an exploded view of a sign holder in an alternate embodiment of the present invention.

FIGS. 6 and 7 illustrate a sign holder apparatus 100 in an alternate embodiment of the present invention. The sign holder apparatus comprises features and elements similar to the sign holder apparatus 10, as described above, including a base 118, an extendable pole 114 having a first pole segment 132*a* slidably disposed within a second pole segment 132*b*, and a sign placard 116 that may be held within the extendable pole 114 via a U-shaped carriage 138 held within a slot 136 near a top of the sign placard 116. Rather than having the sign placard 16 extending from a retail display and positioned perpendicular to the base 18 thereof, as shown in FIGS. 1-4, the sign placard 116 may be displayed roughly parallel to the base 118. To accomplish this, the second pole segment 132*b* may have a third pole segment 132*c* extending perpendicular to the second pole segment 132*b*, thereby forming the extendable bar 114 having a T-shaped extension on an end thereof. The third pole segment 132*c* may have a slot disposed on a bottom side of the third pole segment 132*c* (not shown) so that the sign placard 116 may be slid therein through an opening in an end 140 of the third pole segment 132*c* and held in place via the U-shaped carriage 138. A cap 144 may be utilized to hold the U-shaped carriage and, thus, the sign placard 116 in place.

The base 118 may have extending hooks (not shown) similar to the extending hooks that extend from base 18, as described above, to engage a slotted display bar. Thus, bases 18 and 118, as described above may be utilized as illustrated in FIG. 5, wherein the hooks 22 may extend therefrom to hook into slots within the slotted display bar 24.

Figure 8:
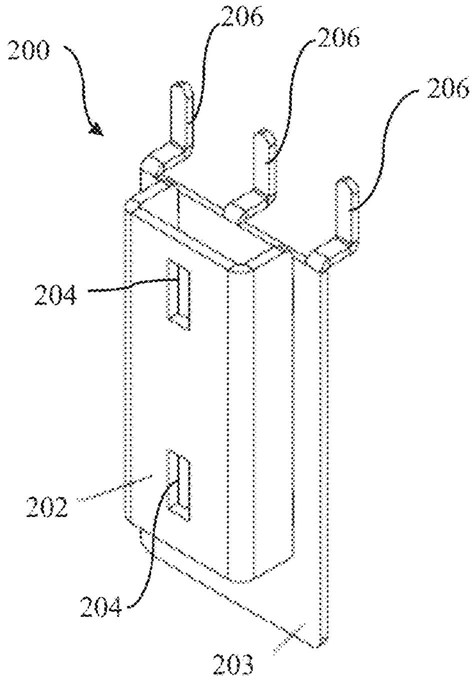
FIG. 8 illustrates a perspective view of a sign holder peg board conversion attachment in an embodiment of the present invention.
Figure 9:
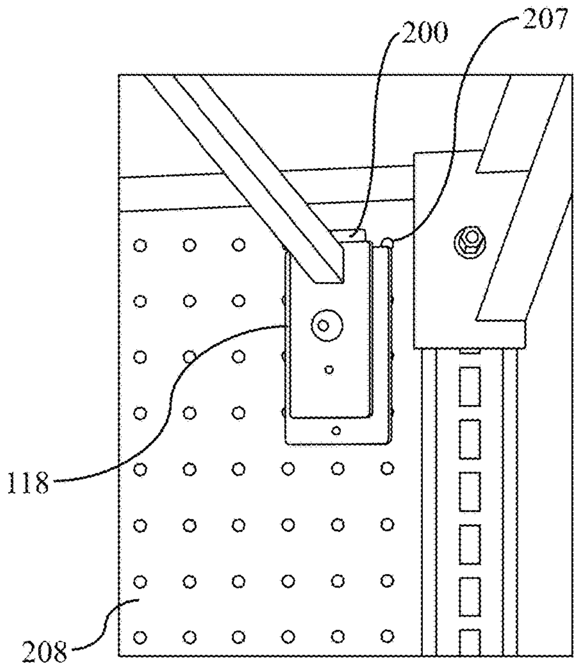
FIG. 9 illustrates a close-up view of a sign holder with a peg board conversion attachment in an embodiment of the present invention.

However, retail displays often contain peg boards instead of slotted display bars, as shown and described above. To accommodate such a configuration, a peg board adapter element 200 may be utilized, as shown in FIGS. 8 and 9. The peg board adapter element 200 may comprise a cuboid base 202 on a plate 203 having a pair of slots 204 therein that are configured to receive hooks 22 extending from the bases 18 and 118, described above. The cuboid base 202 may further comprise a plurality of peg board aperture hooks 206 that may be utilized to engage peg board apertures, as shown in FIG. 9. Therefore, the base 18 or 118, as described above, may be engaged to the cuboid base 202 wherein the hooks 22 of the base 18 or base 118 may engage the slots 204 within the cuboid base 202, and the peg hoard aperture hooks 206 extending from the cuboid base 202 may engage with peg board apertures, thereby holding the sign holder apparatus 10 or 100 in place on peg board 208.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

What is claimed is:

1. A sign holder apparatus comprising:

a base having a connection hook configured to engage and be rigidly held to a retail display element, wherein the retail display element comprises a mating aperture for the connection hook;

a first pole extending from the base and slidably disposed within a second pole;

a sign placard comprising a first slot at a top thereof, the slot having a U-shaped carriage therein, wherein the U-shaped carriage is sized and shaped to slide fully and is fully encompassed within the second pole; and a second slot on a bottom of the second pole, wherein the sign placard is configured to slide through the second slot on the bottom of the second pole when the U-shaped carriage is fully slid within the second pole, wherein the second slot on the bottom of the second pole has a length and further wherein the sign placard has a width, and wherein the length of the second slot is the same size or larger than the width of the sign placard.

2. The sign holder apparatus of claim 1 wherein the first pole has a square cross-section.

3. The sign holder apparatus of claim 2 wherein the second pole has a square cross-section.

4. The sign holder apparatus of claim 1 further comprising:

a set screw within the second pole for holding the second pole in relation to the first pole.

5. The sign holder apparatus of claim 1 wherein the base comprises at least two connection hooks.

6. The sign holder apparatus of claim 1 wherein the sign placard extends vertically under the second pole and perpendicular to a front face of the base.

7. The sign holder apparatus of claim 1 further comprising:

an end cap frictionally held within an end of the second pole to hold the U-shaped carriage and sign placard in place within the second pole.

8. The sign holder apparatus of claim 1 further comprising:

a peg board adapter comprising a cuboid base, at least one slot within the cuboid base, and an extension hook configured to engage an aperture of a peg board, wherein the at least one slot within the cuboid base is configured to mate with the connection hook of the base of the sign holder apparatus.

9. A sign holder apparatus comprising:

a base having a connection hook configured to engage and be rigidly held to a retail display element, wherein the retail display element comprises a mating aperture for the connection hook;

a first pole extending from the base and slidably disposed within a second pole; a third pole extending perpendicular to the second pole;

a sign placard comprising a first slot at a top thereof, the first slot having a U-shaped carriage therein, wherein the U-shaped carriage is sized and shaped to slide within the third pole; and a second slot on a bottom of the third pole, wherein the sign placard is configured to slide through the second slot on the bottom of the third pole.

10. The sign holder apparatus of claim 9 wherein the first pole has a square cross-section.

11. The sign holder apparatus of claim 10 wherein the second pole has a square cross-section.

12. The sign holder apparatus of claim 9 further comprising:

a set screw within the second pole for holding the second pole in relation to the first pole.

13. The sign holder apparatus of claim 9 wherein the base comprises at least two connection hooks.

14. The sign holder apparatus of claim 9 wherein the sign placard extends vertically under the third pole and parallel to a front face of the base.

15. The sign holder apparatus of claim 9 further comprising:

an end cap frictionally held within an end of the third pole to hold the U-shaped carriage and sign placard in place within the second pole.

16. The sign holder apparatus of claim 9 further comprising:

a peg board adapter comprising a cuboid base, at least one slot within the cuboid base, and an extension hook configured to engage an aperture of a peg board, wherein the at least one slot within the cuboid base is configured to mate with the connection hook of the base of the sign holder apparatus.

* * * * *